(12) United States Patent
Yamashita et al.

(10) Patent No.: US 10,590,839 B2
(45) Date of Patent: Mar. 17, 2020

(54) MARINE VESSEL OPERATED WITH HYBRID TURBOCHARGED INTERNAL COMBUSTION ENGINE

(71) Applicant: Mitsubishi Heavy Industries, Ltd., Tokyo (JP)

(72) Inventors: Yukio Yamashita, Tokyo (JP); Musashi Sakamoto, Tokyo (JP); Yoshihisa Ono, Nagasaki (JP); Keiichi Shiraishi, Nagasaki (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 223 days.

(21) Appl. No.: 15/711,850

(22) Filed: Sep. 21, 2017

(65) Prior Publication Data

US 2018/0016970 A1 Jan. 18, 2018

Related U.S. Application Data

(63) Continuation of application No. 14/787,742, filed as application No. PCT/JP2015/054878 on Feb. 20, 2015, now Pat. No. 9,822,699.

(30) Foreign Application Priority Data

Feb. 25, 2014 (JP) ................................. 2014-034153

(51) Int. Cl.
*F02B 39/10* (2006.01)
*F02B 37/10* (2006.01)
(Continued)

(52) U.S. Cl.
CPC .............. *F02B 39/10* (2013.01); *F02B 37/10* (2013.01); *F02D 41/0007* (2013.01);
(Continued)

(58) Field of Classification Search
CPC .......... F02B 39/10; F02B 37/10; H02P 21/18; H02P 21/141; H02P 27/06; F02D 41/0007; F02D 2041/14; Y02T 10/144
(Continued)

(56) References Cited

U.S. PATENT DOCUMENTS 4,292,531 A * 9/1981 Williamson ............. B60K 6/26
290/14
4,694,654 A 9/1987 Kawamura
(Continued)

FOREIGN PATENT DOCUMENTS

EP 1810861 A1 7/2007
JP H042887832 A 10/1992
(Continued)

OTHER PUBLICATIONS

International Search Report, App. No. PCT/JP2015/054378, dated May 12, 2015, 4 Pages.
(Continued)

*Primary Examiner* — Thai Ba Trieu
(74) *Attorney, Agent, or Firm* — Berkeley Law & Technology Group, LLP

(57) ABSTRACT

A hybrid turbocharger includes a first power conversion unit to convert direct-current power into alternating-current power to be output to a generator motor, a smoothing capacitor between direct-current buses, and a control unit that controls the first power conversion unit so as to cause actual generator motor speed to comply with an engine speed command of the generator motor input from an upstream controller during a motoring operation of the generator motor. The control unit changes the engine speed command to a value which is equal to or greater than the actual generator motor speed if the engine speed command of the generator motor is less than the actual generator motor
(Continued)

speed and a direct-current bus voltage is equal to or greater than a predetermined first threshold value during the motoring operation. Accordingly, the direct-current bus voltage can be prevented from increasing during the motoring operation.

3 Claims, 10 Drawing Sheets

(51) Int. Cl.
| | |
|---|---|
| *H02P 21/18* | (2016.01) |
| *H02P 21/14* | (2016.01) |
| *H02P 27/06* | (2006.01) |
| *F02D 41/00* | (2006.01) |
| *F02D 41/14* | (2006.01) |

(52) U.S. Cl.
CPC ............ *H02P 21/141* (2013.01); *H02P 21/18* (2016.02); *H02P 27/06* (2013.01); *F02D 2041/1409* (2013.01); *Y02T 10/144* (2013.01)

(58) Field of Classification Search
USPC .................................................. 60/607–608
See application file for complete search history.

(56) References Cited

U.S. PATENT DOCUMENTS

| | | | |
|---|---|---|---|
| 4,886,978 A | 12/1989 | Kawamura | |
| 5,959,430 A | 9/1999 | Yuki et al. | |
| 6,128,204 A | 10/2000 | Munro et al. | |
| 6,631,080 B2 | 10/2003 | Trimble et al. | |
| 6,703,719 B1 | 3/2004 | McConnell | |
| 7,084,600 B2 | 8/2006 | Suzuki et al. | |
| 7,336,000 B2* | 2/2008 | Stahlhut ............... | F01N 5/04 290/40 C |
| RE40,713 E | 5/2009 | Geis et al. | |
| 7,795,825 B2* | 9/2010 | Williams ............... | H02P 29/032 318/156 |
| 7,893,554 B2 | 2/2011 | Stahlhut et al. | |
| 8,194,367 B2 | 6/2012 | Oshida | |
| 8,227,935 B2 | 7/2012 | Nishiyama | |
| 8,253,357 B2* | 8/2012 | Bailey ................... | B60L 50/61 318/143 |
| 8,479,513 B2* | 7/2013 | Shimizu ................ | F02B 39/10 60/608 |
| 8,584,459 B2* | 11/2013 | Richards ............... | F02B 39/10 60/608 |
| 8,796,963 B2* | 8/2014 | Satou .................... | H02P 21/18 318/400.04 |
| 9,109,503 B2* | 8/2015 | Niizuma ................ | F02B 39/10 |
| 9,112,441 B2 | 8/2015 | Yamashita et al. | |
| 9,469,185 B2 | 10/2016 | Okada et al. | |
| 9,822,699 B2* | 11/2017 | Yamashita ............. | F02B 39/10 |
| 10,066,539 B2* | 9/2018 | Yamashita ............. | F02B 39/10 |
| 2002/0195821 A1 | 12/2002 | Wacknov | |
| 2007/0137197 A1 | 6/2007 | Turner | |
| 2008/0047268 A1* | 2/2008 | Isogai .................... | F02B 39/10 60/608 |
| 2010/0066277 A1* | 3/2010 | Bailey ................... | B60L 50/61 318/143 |
| 2010/0066288 A1* | 3/2010 | Williams ............... | H02P 29/032 318/434 |
| 2010/0295375 A1 | 11/2010 | Oshida | |
| 2013/0106368 A1 | 5/2013 | Yamashita et al. | |
| 2013/0221885 A1* | 8/2013 | Hunter .................. | H02P 21/0003 318/400.15 |
| 2014/0346865 A1 | 11/2014 | Akashi et al. | |
| 2015/0174998 A1 | 6/2015 | Okada et al. | |
| 2015/0180384 A1 | 6/2015 | An et al. | |
| 2015/0315989 A1* | 11/2015 | Andrejak .............. | H02P 9/04 123/350 |
| 2015/0365037 A1* | 12/2015 | Watabu .................. | H02P 27/06 318/400.3 |
| 2016/0356206 A1 | 12/2016 | Yamashita et al. | |
| 2019/0052210 A1* | 2/2019 | Li ........................... | H02P 21/05 |

FOREIGN PATENT DOCUMENTS

| | | | |
|---|---|---|---|
| JP | H070957775 A | | 4/1995 |
| JP | 2888170 B2 | | 5/1999 |
| JP | 2006320143 A | * | 11/2006 |
| JP | 2007238300 A | | 9/2007 |
| JP | 2009019561 A | | 1/2009 |
| JP | 2012205428 A | | 10/2012 |
| JP | 2012214143 A | | 11/2012 |
| WO | 2014013622 A1 | | 1/2014 |
| WO | 2015129590 A1 | | 9/2015 |

OTHER PUBLICATIONS

Written Opinion of the International Searching Authority, App. No. PCT/JP2015/054878, dated May 12, 2015, 8 Pages.
European Office Action, App. No. EP15755148.2, dated Nov. 30, 2017, 6 Pages.
Extended European Search Report, App. No. 15755148.2, dated Apr. 21, 2016, 10 Pages.
Office Action Summary for Applications Under Accelerated Examination, U.S. Appl. No. 14/787,742, dated May 5, 201, 24 Pages.
Notice of Allowance, U.S. Appl. No. 14/787,742, dated Jul. 19, 2017, 20 Pages.

* cited by examiner

PRIOR ART

MARINE VESSEL OPERATED WITH HYBRID TURBOCHARGED INTERNAL COMBUSTION ENGINE

RELATED APPLICATIONS

This application is a continuation of U.S. application Ser. No. 14/787,742, entitled "TURBOCHARGER AND MARINE VESSEL," filed Oct. 28, 2015, which claims priority to and is a 371 of International Patent Application No.: PCT/JP2015/054878, filed Feb. 20, 2015 which is assigned to the assignee hereof and is expressly incorporated herein by reference.

TECHNICAL FIELD

The present invention relates to a turbocharger and a marine vessel including a turbocharger.

BACKGROUND

In the related art, there is a known hybrid turbocharger which not only utilizes engine exhaust gas discharged from an internal-combustion engine as a compressor driving force of the turbocharger but also utilizes the same as power for driving a generator motor, so as to obtain generating power. FIG. 10 illustrates a configuration of the hybrid turbocharger in the related art. As illustrated in FIG. 10, for example, a hybrid turbocharger 100 includes an exhaust turbine 101 that is driven by exhaust gas discharged from an internal-combustion engine such as a diesel engine for a marine vessel, a compressor 102 that is driven by the exhaust turbine 101 and boosts outside air to the internal-combustion engine, and a generator motor 103 that is joined to rotary shafts of the exhaust turbine 101 and the compressor 102. The generating power of an alternating-current obtained by the generator motor 103 is converted into direct-current power by a converter 104. Thereafter, an inverter 105 inverts the direct-current power into three-phase alternating-current power having a frequency corresponding to that of a system 106, thereby being supplied to the system 106. A smoothing capacitor 107 for absorbing a fluctuation of a direct-current voltage is provided between the converter 104 and the inverter 105 while being connected thereto.

Generally, in the hybrid turbocharger, a motoring operation (an operation state in which electric power is supplied from an inverter to a generator motor) and a regenerating operation of the generator motor, are alternately determined by an upstream controller which controls the internal-combustion engine. Therefore, the regenerating operation is prohibited when the motoring operation is selected by the upstream controller. On the contrary, the motoring operation is prohibited when the regenerating operation is selected.

Patent Document 1: Japanese Unexamined Patent Application Publication No. 2012-214143
Patent Document 2: Japanese Unexamined Patent Application Publication No. 7-95775

SUMMARY

However, for example, if a motoring operation of a generator motor is selected by an upstream controller, if an engine speed command of the generator motor falls below actual generator motor speed, even though a regeneration operating is prohibited, a slight amount of motoring power is generated and the motoring power is accumulated in a smoothing capacitor, thereby resulting in the gradual increase of a direct-current bus voltage. If the direct-current bus voltage increases and exceeds a predetermined value of tolerance, there is a possibility of the occurrence of breakage, tripping, or the like in a semiconductor element and a capacitor. The above-described problem occurs not only in a hybrid turbocharger but also occurs in an apparatus including a compressor which is driven by a turbine and boosts outside air to an internal-combustion engine, and an electric motor which is joined to a rotary shaft of the compressor, in a similar manner, for example.

DETAILED DESCRIPTION

Figure 1:
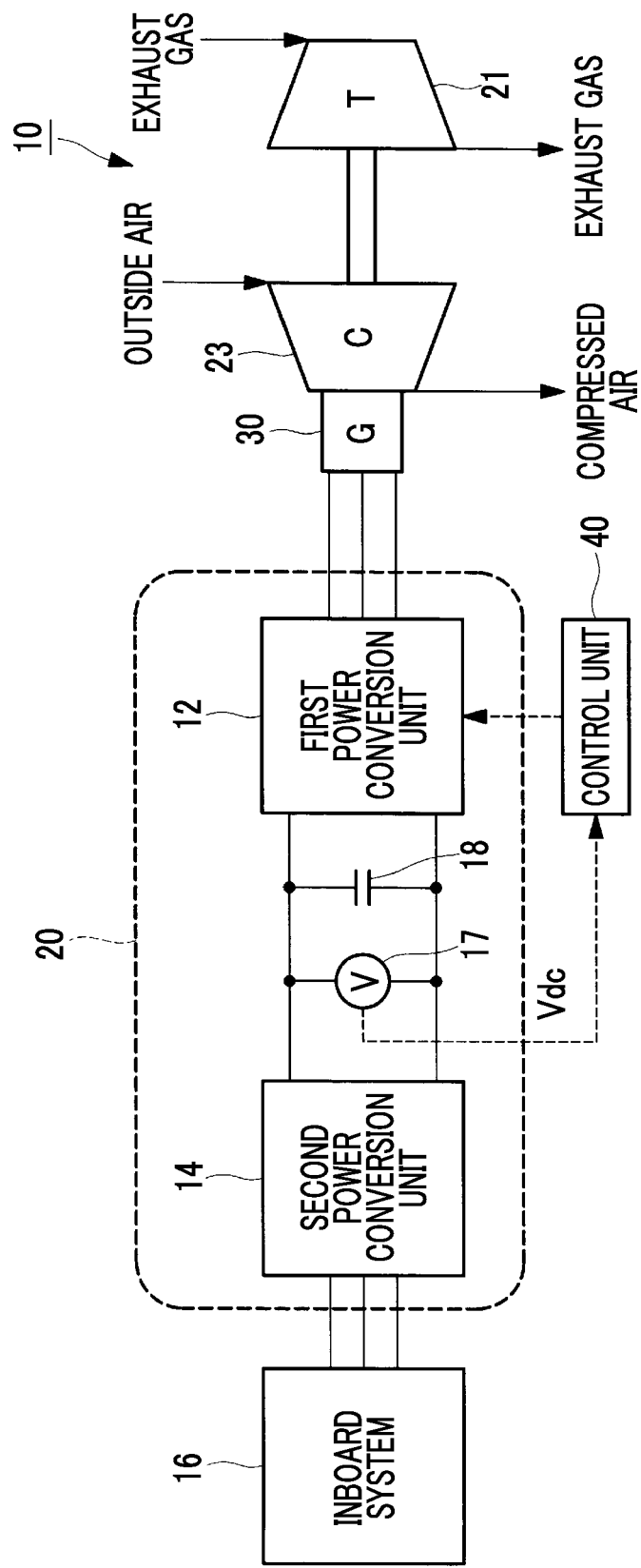
FIG. 1 is a diagram illustrating a schematic configuration of a marine vessel hybrid turbocharger in a first embodiment.

Particular embodiments may provide a turbocharger and a marine vessel having the turbocharger which can prevent the direct-current bus voltage from increasing during a motoring operation. According to a first embodiment, there is provided a turbocharger including a compressor, which is driven by a turbine and boosts outside air to an internal-combustion engine, and an electric motor which is joined to a rotary shaft of the compressor. The turbocharger includes power conversion unit that has a function by which direct-current power is converted into alternating-current power and is output to the electric motor, a smoothing capacitor that is provided in a direct-current bus which is connected to the power conversion unit, and control unit that controls the power conversion unit so as to cause actual generator motor speed to comply with an engine speed command of the electric motor input from an upstream controller during a motoring operation of the electric motor. The control unit includes command change unit which changes the engine speed command to a value that approaches, such as a value that is equal to or greater than the actual generator motor speed, if the engine speed command of the electric motor is less than the actual generator motor speed and a line-to-line voltage of the smoothing capacitor approaches, or is equal to or greater than, a predetermined first threshold value during the motoring operation of the electric motor.

According to the turbocharger, since the engine speed command is changed to the value equal to or greater than the actual generator motor speed if the engine speed command of the electric motor is less than the actual generator motor speed and the direct-current bus voltage is equal to or greater than, or at least approaches, the predetermined first threshold value during the motoring operation, electric power consumed in the electric motor can be increased. Accordingly, it is possible to release an electrical charge accumulated in the smoothing capacitor which is provided between the direct-current buses. Thus, it is possible to lower the direct-current bus voltage. The "actual generator motor speed" of the electric motor is measured, for example, by an engine speed measurement unit (not shown). For example, the engine speed measurement unit may comprise an engine speed sensor (not shown) provided in the electric motor or may comprise an engine speed which is estimated through computation performed based on a motor current and the like. Regarding the motor current, the motor current applied from the power conversion unit to the electric motor may be measured, or estimation may be performed based on a direct current and the like flowing in the direct-current bus. The method of estimation performed based on the direct current uses a current having noise components fewer than those in the motor current. Thus, it is possible to enhance accuracy of the estimation.

In the turbocharger, the control unit may reset the engine speed command to the engine speed command input from the upstream controller if the line-to-line voltage of the smoothing capacitor becomes equal to or less than a second threshold value which is a value equal to or less than the first threshold value from if the engine speed command is changed until after a predetermined period of time has elapsed.

In this case, since the engine speed command is reset to the original engine speed command if the line-to-line voltage of the smoothing capacitor, that is, the direct-current bus voltage becomes equal to or less than the second threshold value, it is possible to cause the engine speed of the electric motor to comply with the engine speed command which is applied from the upstream controller.

In the turbocharger, the command change unit may lower an increasing amount of the engine speed command if the engine speed command is changed at a frequency equal to or greater than a predetermined frequency.

Power consumption can be slowed down by lowering the increasing amount of the engine speed command if the engine speed command is frequently changed. As a result, the rate of decline in the terminal voltage of the smoothing capacitor can be slowed down. Thus, it is possible to prevent the engine speed command from being frequently switched.

In the marine vessel hybrid turbocharger, the command change unit may set the engine speed command to a greater value if the line-to-line voltage of the smoothing capacitor becomes no less than the second threshold value, even after a predetermined period of time has elapsed from if the engine speed command is changed.

The difference between the actual generator motor speed and the engine speed command is increased by changing the engine speed command to the greater value if there is an insignificant effect, even though the engine speed command is changed and the line-to-line voltage of the smoothing capacitor does not become less than the second threshold value, even after the predetermined period of time has elapsed. Accordingly, since electric power supplied to the electric motor increases, the electrical charge of the smoothing capacitor can be released further. Thus, it is possible to lower the line-to-line voltage of the smoothing capacitor.

According to a second embodiment, there is provided a turbocharger including a compressor which is driven by a turbine and boosts outside air to an internal-combustion engine, and an electric motor which is joined to a rotary shaft of the compressor. The turbocharger includes a power conversion unit that has a function by which direct-current power is converted into alternating-current power and is output to the electric motor, a smoothing capacitor that is provided in a direct-current bus which is connected to the power conversion unit, and control unit that applies a control signal to the power conversion unit so as to cause actual generator motor speed to comply with an engine speed command of the electric motor input from an upstream controller during a motoring operation of the electric motor. The control unit generates a control command so as to increase an excitation current component and applies the control command to the power conversion unit if the engine speed command of the electric motor is less than the actual generator motor speed and a line-to-line voltage of the smoothing capacitor is equal to or greater than a predetermined threshold value during the motoring operation of the electric motor.

According to the turbocharger, the excitation current component is increased if the engine speed command of the electric motor is less than the actual, or measured, generator motor speed and the line-to-line voltage of the smoothing capacitor, that is, the direct-current bus voltage is equal to or greater than the threshold value. Accordingly, reactive power consumed in the electric motor can be increased. As a result, the electrical charge released from the smoothing capacitor provided between the direct-current buses increases. Thus, it is possible to lower the line-to-line voltage of the smoothing capacitor.

According to a third embodiment, there is provided a turbocharger including a compressor which is driven by a turbine and boosts outside ambient air to an internal-combustion engine, and an electric motor which is joined or coupled to a rotary shaft of the compressor. The turbocharger includes a power conversion unit comprising a function by which direct-current power is converted into alternating-current power and is output or sent to the electric motor, a smoothing capacitor that is provided in a direct-current bus which is connected to the power conversion unit, a resistor that is connected to the smoothing capacitor in parallel, a semiconductor switch that is connected to the resistor in series and is in an open state while being in a steady state, and switching control unit that controls ON-OFF of the semiconductor switch. The switching control unit performs ON-OFF ratio control of the semiconductor switch within a predetermined duty cycle if the engine speed command of the electric motor is less than the actual generator motor speed and a line-to-line voltage of the smoothing capacitor approaches, or is equal to or greater than, a predetermined threshold value during a motoring operation of the electric motor.

According to the turbocharger, the ON-OFF ratio control of the semiconductor switch is performed by the switching control unit if the engine speed command is less than the actual generator motor speed and the line-to-line voltage of the smoothing capacitor, that is, the direct-current bus voltage approaches, or becomes equal to or greater than, the threshold value during the motoring operation of the electric motor. Accordingly, since the electrical charge of the smoothing capacitor is consumed by resistance during the time period in which the semiconductor switch is turned ON, the line-to-line voltage of the smoothing capacitor can be lowered. Since the semiconductor switch is used as a switching element, the switching frequency can range from several hundreds of Hz to several kHz. Thus, it is possible to prevent overcurrent at the moment of discharging electricity.

In the turbocharger, the switching control unit may set the ON-OFF ratio within the duty cycle based on proportional-integral control to which a difference between the line-to-line voltage of the smoothing capacitor and the predetermined threshold value is input, and lower at least any one of a proportional gain and an integral gain in the proportional-integral control by performing the ON-OFF ratio control of the semiconductor switch if a fluctuation of an engine speed of the electric motor becomes equal to or greater than a predetermined value.

In this case, since at least any one of the proportional gain and the integral gain in the proportional-integral control is lowered by performing the ON-OFF ratio control of the semiconductor switch if the fluctuation of the engine speed of the electric motor becomes equal to or greater than the predetermined value, it is possible to slow down the descending speed of the line-to-line voltage of the smoothing capacitor.

In the turbocharger, the switching control unit may increase at least any one of the proportional gain and the integral gain in the proportional-integral control if the line-to-line voltage of the smoothing capacitor does not become equal to or less than the threshold value within a predetermined period of time from a start of the ON-OFF ratio control of the semiconductor switch.

In this case, since at least any one of the proportional gain and the integral gain in the proportional-integral control is increased if the line-to-line voltage of the smoothing capacitor does not become equal to or less than the threshold value within the predetermined period of time from the start of the ON-OFF ratio control of the semiconductor switch, it is possible to quicken the descending speed of the line-to-line voltage of the smoothing capacitor.

According to a fourth embodiment, there is provided a marine vessel which includes the above-described turbocharger and an internal-combustion engine to which the turbocharger boosts outside air.

According to a embodiment, there is provided a method in which a smoothing capacitor prevents a fluctuation of a voltage of direct-current power, and the direct-current power is converted into alternating-current power and is output or sent to an electric motor so as to bring about actual or measured generator motor speed to comply with an engine speed command of the electric motor. The engine speed command is changed to a value which is greater than the actual generator motor speed, and the direct-current power is converted into the alternating-current power and is output to the electric motor based on the changed engine speed command if the engine speed command of the electric motor is less than the actual generator motor speed and a line-to-line voltage of the smoothing capacitor is equal to or greater than a predetermined threshold value during a motoring operation of the electric motor.

According to a sixth embodiment, there is provided a method in which a smoothing capacitor prevents a fluctuation of a voltage of direct-current power, and the direct-current power is converted into alternating-current power and is output to an electric motor so as to bring about a measured generator motor speed to comply with an engine speed command of the electric motor. A control command is generated so as to increase an excitation current component, and the direct-current power is converted into the alternating-current power and is output to the electric motor if the engine speed command of the electric motor is less than the actual generator motor speed and a line-to-line voltage of the smoothing capacitor is equal to or greater than a predetermined threshold value during a motoring operation of the electric motor.

According to a second embodiment, there is provided a method in which a smoothing capacitor prevents a fluctuation of a voltage of direct-current power, and the direct-current power is converted into alternating-current power and is output or sent to an electric motor so as to bring about actual or measured generator motor speed to comply with an engine speed command of the electric motor. The resistor is connected to the smoothing capacitor in parallel, and then, a semiconductor switch, which is in an open state while being in a steady state, is connected to the resistor in series. ON-OFF ratio control of the semiconductor switch is performed within a predetermined duty cycle if the engine speed command of the electric motor is less than the actual generator motor speed and a line-to-line voltage of the smoothing capacitor is equal to or greater than a predetermined threshold value during a motoring operation of the electric motor.

Accordingly, embodiments provide an effect of being able to prevent a direct-current bus voltage from increasing during a motoring operation.

Hereinafter, embodiments in a case in which a turbocharger is applied to a marine vessel as a hybrid turbocharger will be described with reference to the drawings.

FIG. 1 is a diagram illustrating a schematic configuration of the marine vessel hybrid turbocharger (hereinafter, referred to as "the hybrid turbocharger") in a first embodiment. As illustrated in FIG. 1, a hybrid turbocharger 10 includes an exhaust turbine 21 that is driven by exhaust gas discharged from a diesel engine (an internal-combustion engine (not shown)) for a marine vessel, a compressor 23 that is driven by the exhaust turbine 21 and boosts outside air to the internal-combustion engine, and a generator motor 30 that is joined or coupled to rotary shafts of the exhaust turbine 21 and the compressor 23. The hybrid turbocharger 10 not only utilizes the engine exhaust gas discharged from the diesel engine for a marine vessel as a compressor driving force of the turbocharger but also utilizes the same as power for driving the generator motor 30, so as to obtain generating power.

The hybrid turbocharger 10 includes a power conversion apparatus 20 which is provided between the generator motor 30 and an onboard electrical grid 16. The power conversion apparatus 20 includes a first power conversion unit 12, a second power conversion unit 14, and a smoothing capacitor 18 as the main configuration.

The first power conversion unit 12 causes, or brings about, the generating power of the generator motor 30 to be converted into direct-current power and to be output during the regenerating operation of the generator motor 30, and the first power conversion unit 12 causes, or brings about, the direct-current power to be converted into alternating-current power and to be output to the generator motor 30 during the motoring operation. The second power conversion unit 14 causes, or brings about, the direct-current power from the first power conversion unit 12 to be converted into three-phase alternating-current power suitable for the system and to be output to the onboard electrical grid 16 during the regenerating operation of the generator motor 30, and the second power conversion unit 14 causes, or brings about, the three-phase alternating-current power from the onboard electrical grid 16 to be converted into the direct-current power during the motoring operation and to be output or sent to the first power conversion unit 12. The smoothing capacitor 18 is provided between direct-current buses between the first power conversion unit 12 and the second power conversion unit 14, thereby reducing a fluctuation of a direct-current voltage. The actual generator motor speed of the generator motor 30 is measured by general engine speed measurements or is determined based on a voltage fluctuation cycle. Actual generator motor speed N is transmitted to a control unit 40.

The first power conversion unit 12 and the second power conversion unit 14 described above is configured to comprise a circuit in which six switching elements are subjected to bridge connection. Here, the configurations of the first power conversion unit 12 and the second power conversion unit 14 are not limited to the above-described examples, and other configurations can be employed. For example, a configuration including a rectifier circuit in which six diode elements are subjected to bridge connection and a circuit in which the direct-current voltage generated by the rectifier circuit is stepped up and down by using one or two switching elements may be employed. Otherwise, a configuration in which "circuits configured to have the six switching elements which are subjected to bridge connection" or "circuits in which the direct-current voltage generated by the rectifier circuit in which the six diode elements are subjected to bridge connection are stepped up and down by using one or two switching elements" (so called multi-level circuits) are combined in multi levels may be employed. In addition, a matrix conversion configuration configured to have nine switching elements may be employed. Furthermore, a configuration in which the matrix conversion configurations are formed in multi levels may be employed.

The first power conversion unit 12 is controlled by the control unit 40. There is also provided a control unit (not illustrated) for controlling the second power conversion unit 14, but the description thereof will be omitted herein. In the hybrid turbocharger 10, a voltage detection unit 17 for detecting a direct-current bus voltage, that is, a line-to-line voltage of the smoothing capacitor 18 is provided between the direct-current buses.

Figure 2:
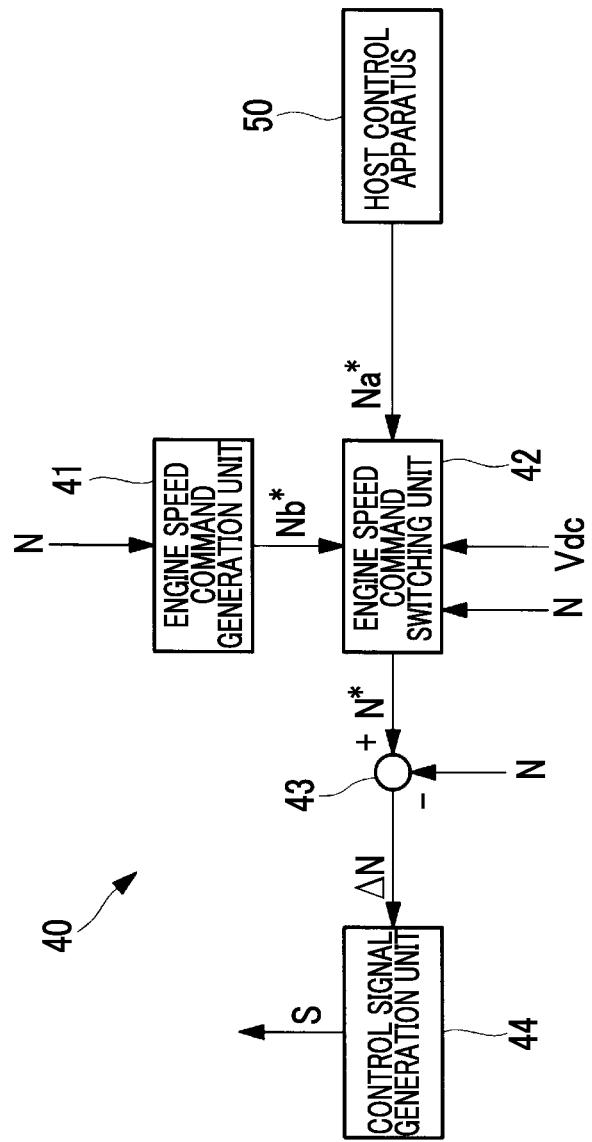
FIG. 2 is a schematic functional block diagram of a control unit in the first embodiment.

FIG. 2 is a schematic functional block diagram of the control unit 40. The control unit 40 has a function to control the first power conversion unit 12 so as to cause, or brings about, the engine speed of the generator motor 30 to coincide with an engine speed command N* during the motoring operation of the generator motor 30. Whether to perform the motoring operation or the regenerating operation for the generator motor 30 is determined based on a command from an upstream controller 50. In other words, if making selection between the motoring operation and the regenerating operation, a relationship between the engine speed command N* and the actual generator motor speed N of the generator motor 30 is not considered. Therefore, if the motoring operation is selected in the upstream controller 50, the apparatus is controlled so as not to perform the regenerating operation during the motoring operation, even though the actual generator motor speed N exceeds the engine speed command N*.

As illustrated in FIG. 2, the control unit 40 includes an engine speed command generation unit 41, an engine speed command switching unit 42, a difference computation unit 43, and a control signal generation unit 44. The present embodiment illustrates a case where engine speed command change unit is realized by the engine speed command generation unit 41 and the engine speed command switching unit 42. The actual generator motor speed N of the generator motor 30 is input to the engine speed command generation unit 41, so as to generate an engine speed command Nb* which is obtained by increasing the actual generator motor speed N by a predetermined amount. An engine speed command Na* from the upstream controller 50, the actual generator motor speed N of the generator motor 30, the engine speed command Nb* from the engine speed command generation unit 41, and a direct-current bus voltage Vdc from the voltage detection unit 17 are input to the engine speed command switching unit 42. The engine speed command switching unit 42 outputs the engine speed command Na* from the upstream controller 50 as the engine speed command N* if the direct-current bus voltage Vdc is less than a predetermined first threshold value and outputs the engine speed command Nb* from the engine speed command generation unit 41 as the engine speed command N* if the direct-current bus voltage Vdc is equal to or greater than the first threshold value during the motoring operation of the generator motor 30.

The difference computation unit 43 calculates a difference ΔN between the engine speed command N* output from the engine speed command switching unit 42 and the actual generator motor speed N of the generator motor 30 and outputs the difference ΔN to the control signal generation unit 44. The control signal generation unit 44 performs proportional-integral control and the like with respect to the difference between ΔN from the difference computation unit 43, thereby generating a control signal S of the first power conversion unit 12 for causing, or bringing about, the actual generator motor speed N to coincide with the engine speed command N*. For example, the control signal generation unit 44 generates a PWM signal for controlling ON-OFF of the switching elements included in the first power conversion unit 12. Since there are a number of known technologies regarding a control method of generating the PWM signal which causes the actual generator motor speed N to coincide with the engine speed command N*, known technologies may be suitably employed. If there is no sensor, the actual generator motor speed N may be an estimated value.

Figure 3:
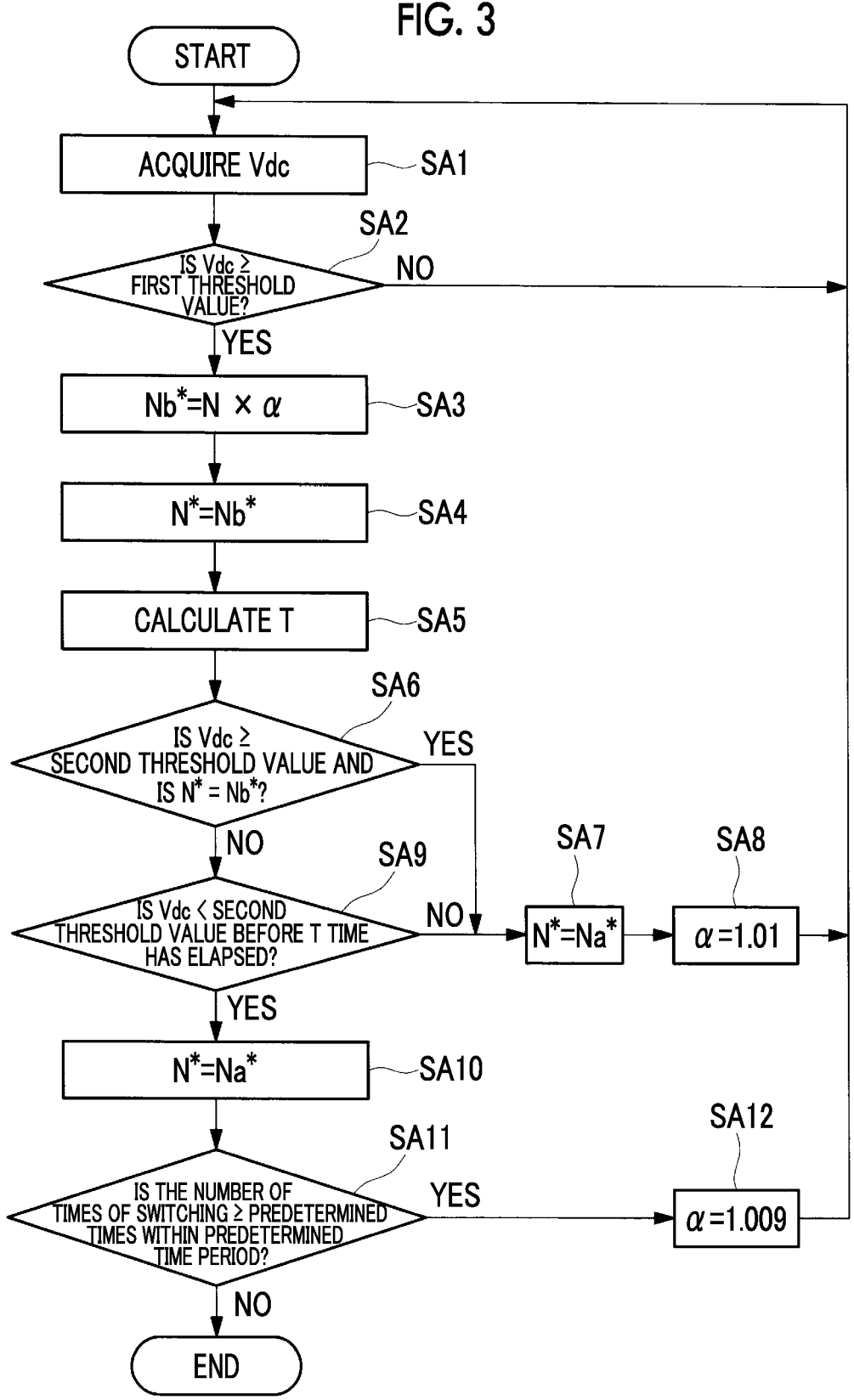
FIG. 3 is a flow chart illustrating an example of a procedure in switching processing of an engine speed command which is executed by the control unit in the first embodiment.

Subsequently, among the methods of processing executed by the control unit 40, switching processing of the engine speed command will be mainly described with reference to FIG. 3. FIG. 3 is a flow chart illustrating an example of the procedure in switching processing of the engine speed command executed by the control unit 40.

First, if the direct-current bus voltage Vdc is input during the motoring operation (Step SA1), it is determined whether or not the direct-current bus voltage Vdc is equal to or greater than the first threshold value (Step SA2). If the direct-current bus voltage Vdc is less than the first threshold value, the procedure returns to Step SA1, and if the direct-current bus voltage Vdc is equal to or greater than the first threshold value, or approaches the first threshold value, the engine speed command Nb* is computed by multiplying the actual generator motor speed N by a coefficient α (for example, α=1.01) (Step SA3). Here, the coefficient α is set based on the coefficient table which is set in advance, and the initial value is set to have α=1.01.

Subsequently, the engine speed command N* is switched from the engine speed command Na* which is input from the upstream controller 50 to the engine speed command Nb* which is computed in Step SA3 (Step SA4). In succession, based on a relationship between required torque and inertia of the generator motor 30, a time T taken until the actual generator motor speed N of the generator motor 30 coincides with the engine speed command Nb* calculated in Step SA3 is computed (Step SA5).

Subsequently, it is determined whether or not the actual generator motor speed N reaches the engine speed command Nb* before the direct-current bus voltage Vdc becomes less than a second threshold value (the first threshold value≥the second threshold value) (Step SA6). If the condition is satisfied ("YES" in Step SA6), the engine speed command N* is switched to the engine speed command Na* input from the upstream controller 50 (Step SA7). In succession, setting is performed to have the coefficient α=1.01 (Step SA8), and the procedure returns to Step SA1. Meanwhile, in Step SA6, if the above-described condition is not satisfied ("NO" in Step SA6), it is determined whether or not the direct-current bus voltage Vdc becomes less than the second threshold value within the T time after the engine speed command N* is switched to Nb* (Step SA9). As a result, if the direct-current bus voltage Vdc does not become less than the second threshold value within the T time ("NO" in Step SA9), the procedure proceeds to Step SA7. Meanwhile, if "YES" in Step SA9, the engine speed command N* is switched to the engine speed command Na* input from the upstream controller 50 (Step SA10). Subsequently, within a predetermined time period from the time if the direct-current bus voltage Vdc becomes equal to or greater than the first threshold value, it is determined whether or not switching of the engine speed command N* is performed equal to or more than a predetermined number of times (Step SA11). For example, the predetermined time period may be the same as the time T which is calculated in Step SA5 as described above and may be set as a time period longer than the time T. In Step SA11, if switching of the engine speed command N* is performed a number of times that is equal to or more than the predetermined times within the predetermined time period, setting is performed to have the coefficient α=1.009 (Step SA12), and the procedure returns to Step SA1. Meanwhile, in Step SA11, if switching of the engine speed command N* is performed a number of times that is less than the predetermined times within the predetermined time period, the processing ends.

As described above, according to the hybrid turbocharger 10 and a method of controlling the same in the present embodiment, if the engine speed command Na* from the upstream controller 50 is less than the actual generator motor speed N of the generator motor 30 and the direct-current bus voltage Vdc is equal to or greater than the predetermined first threshold value during the motoring operation, the engine speed command N* is changed to a value greater than the actual generator motor speed N, for example, to the engine speed command Nb* which is obtained by multiplying the actual generator motor speed N by the predetermined coefficient α (however, α>1), and the first power conversion unit 12 is controlled so as to cause, or bring about, a measured or actual generator motor speed N to coincide with the changed engine speed command N*. Accordingly, the electrical charge accumulated in the smoothing capacitor 18 provided between the direct-current buses can be released, and thus, the direct-current bus voltage Vdc can be lowered.

Figure 4:
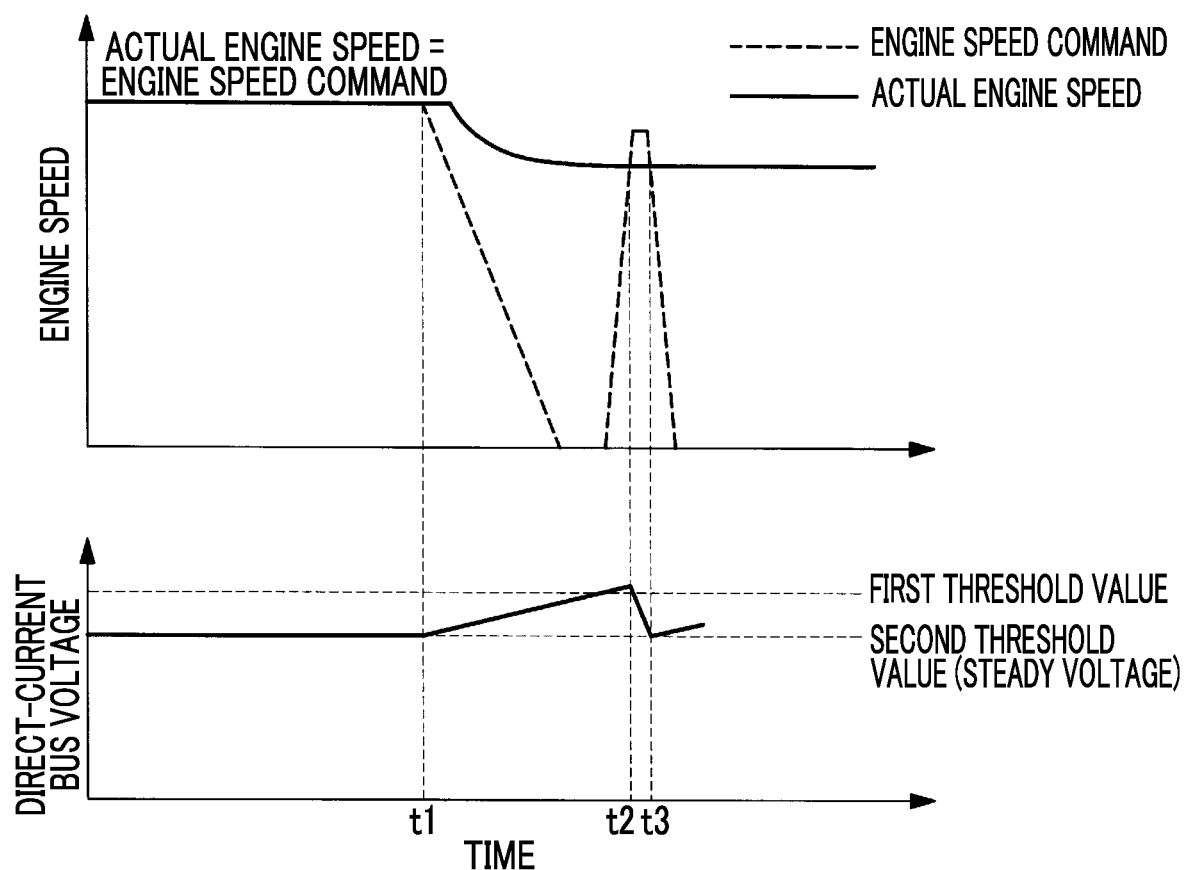
FIG. 4 is a diagram illustrating a relationship among an engine speed, the engine speed command, and a direct-current bus voltage in the first embodiment.

FIG. 4 illustrates a relationship among the engine speed, the engine speed command, and the direct-current bus voltage in the present embodiment. At the time t1 in FIG. 4, if the engine speed command falls below the actual generator motor speed, the direct-current bus voltage increases gradually. At the time t2, if the direct-current bus voltage exceeds the first threshold value, electric power supplied to the generator motor 30 increases by setting the engine speed command to the engine speed command Nb* which is greater than the actual generator motor speed, and the electrical charge of the smoothing capacitor 18 is released. Thus, the direct-current bus voltage is lowered gradually. If the direct-current bus voltage is lowered to the second threshold value (for example, a steady voltage), the engine speed command N* is switched to the engine speed command Na* from the upstream controller 50. In accordance therewith, the direct-current bus voltage rises gradually.

According to the present embodiment, if switching of the engine speed command N* described above is frequently performed due to the direct-current bus voltage Vdc which frequently exceeds the threshold value, the coefficient α, by which the actual generator motor speed N is multiplied may be sequentially changed to smaller values in stages set in advance (for example, 1.01, 1.009, and 1.0008). Accordingly, the rate of decline of the direct-current bus voltage Vdc can be slowed down, and thus, the engine speed command N* can be prevented from being frequently switched.

On the contrary, if the direct-current bus voltage Vdc does not become equal to or less than the threshold value, or does not approach the threshold value, even after the predetermined time period T has elapsed, for example, the value of the coefficient α by which the actual generator motor speed N is multiplied may be changed to greater values in stages. In this manner, if there is an insignificant effect without success in lowering the direct-current bus voltage Vdc, even though the engine speed command N* is changed, the value of the coefficient α is sequentially set to greater values in stages set in advance (for example, 1.01, 1.011, and 1.012), thereby increasing the difference between the engine speed command N* and the actual generator motor speed N. Accordingly, power supplied to the generator motor 30 increases. Therefore, the electrical charge of the smoothing capacitor 18 can be released further, and the direct-current bus voltage Vdc can be lowered.

Figure 5:
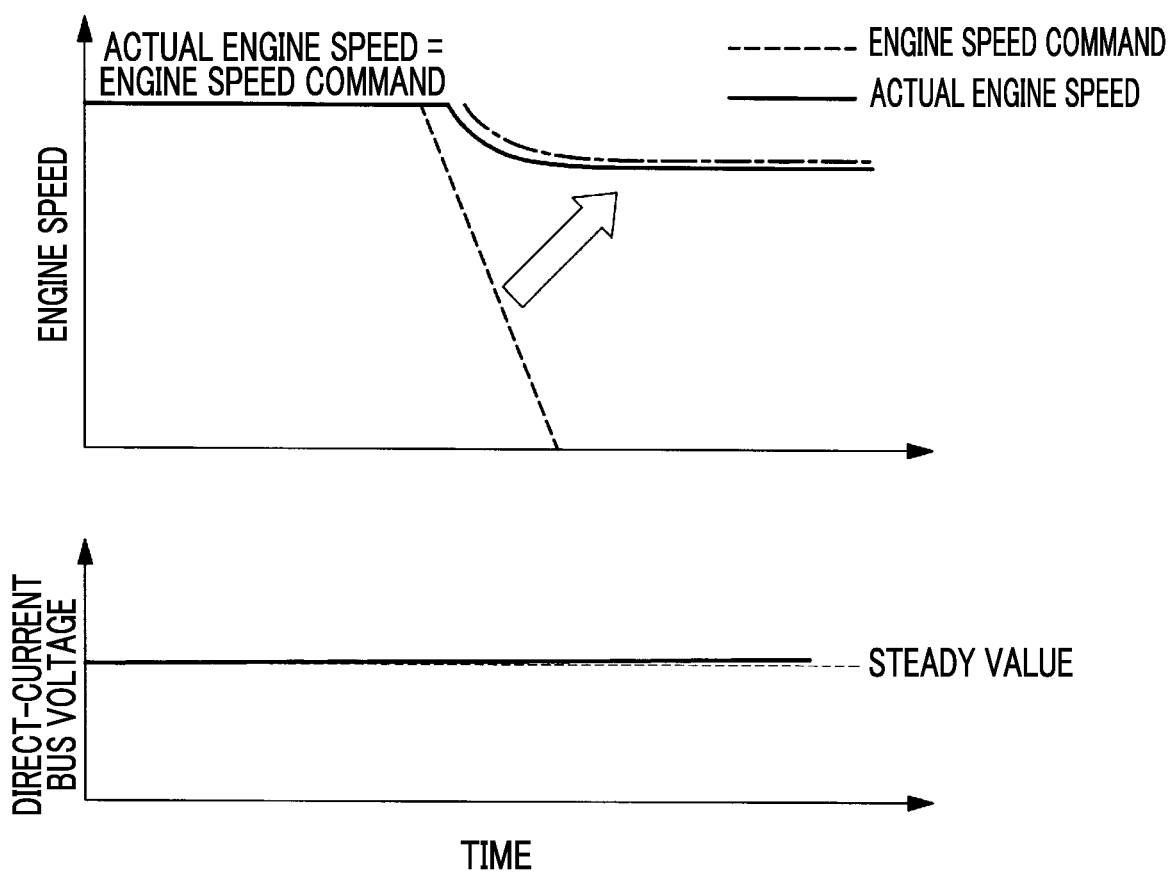
FIG. 5 is a diagram for illustrating another example, that is, a modification example of the engine speed command in the first embodiment.

In the present embodiment, if the engine speed command Na* from the upstream controller 50 becomes less than the actual generator motor speed N and the direct-current bus voltage Vdc is equal to or greater than the first threshold value, the engine speed command N* is changed to the engine speed command Nb*, which is a value greater than the actual generator motor speed. However, for example, in place thereof, as illustrated in FIG. 5, the engine speed command N* may be set so as to cause the engine speed command N* to coincide with the actual generator motor speed N during a period of time in which the engine speed command N* applied from the upstream controller 50 is smaller than the actual generator motor speed N. As the engine speed command N* set in this manner, without changing the control on the onboard electrical grid 16 side, a current can be prevented from flowing from the generator motor 30 to the onboard electrical grid 16 side by using the power conversion apparatus 20 and the control unit 40 thereof provided on the hybrid turbocharger 10 side. Thus, the direct-current bus voltage Vdc can be prevented from rising and can be uniformly maintained at the steady value.

Subsequently, the hybrid turbocharger and the method of controlling the same according to a second embodiment will be described with reference to the drawings. In the hybrid turbocharger and the method of controlling the same according to the first embodiment described above, the engine speed command N*, which is greater than the actual generator motor speed N is set so as to lower the direct-current bus voltage Vdc if the direct-current bus voltage Vdc exceeds the first threshold value during the motoring operation. However, in the present embodiment, consumption of reactive power in the generator motor 30 is increased by increasing an excitation current component command which is referred if generating the control signal output to the first power conversion unit 12, and the direct-current bus voltage Vdc is lowered by increasing loss of the generator motor. Hereinafter, the hybrid turbocharger and the method thereof according to the present embodiment will be described mainly regarding the points different from those in the first embodiment described above.

Figure 6:
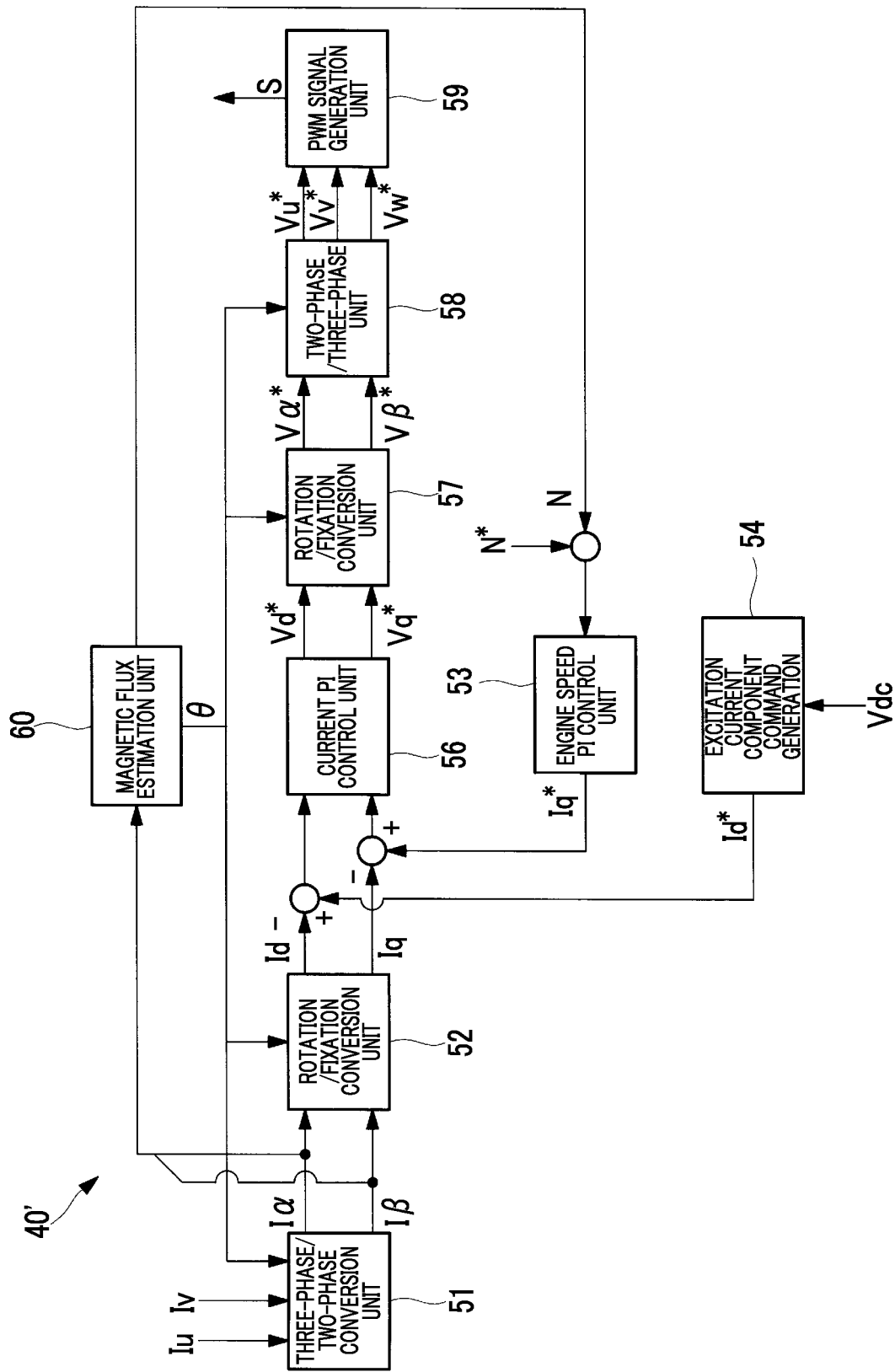
FIG. 6 is a diagram illustrating a schematic configuration of the control unit in a second embodiment.

FIG. 6 is a diagram illustrating a schematic configuration of a control unit 40' in the present embodiment. As illustrated in FIG. 6, the control unit 40' includes a three-phase/two-phase conversion unit 51, a rotation/fixation conversion unit 52, an engine speed PI control unit 53, an excitation current component command generation unit 54, a current PI control unit 56, a fixation/rotation conversion unit 57, a two-phase/three-phase unit 58, and a PWM signal generation unit 59, and a magnetic flux estimation unit 60.

The three-phase/two-phase conversion unit 51 converts a three-phase alternating current flowing in the generator motor 30 into a two-phase current ($\alpha$-phase and $\beta$-phase). For example, conversion is performed while using a current of one phase among the currents of three phases as a reference. In FIG. 6, a current Iu of a u-phase and a current Iv of a v-phase are input to the three-phase/two-phase conversion unit 51. However, a current Iw of a W-phase is calculated by performing computation based on the currents Iu and Iv of the two phases thereof. The rotation/fixation conversion unit 52 performs coordinate transformation with respect to currents I$\alpha$ and I$\beta$ subjected to two-phase conversion by the three-phase/two-phase conversion unit 51 while using rotor positions as a reference, thereby obtaining a d-axis current Id and a q-axis current Iq.

The engine speed PI control unit 53 calculates a q-axis current command (a torque current command) Iq* by executing the proportional-integral control with respect to the difference between the engine speed command N* and the engine speed N of the generator motor 30 so as to cause, or bring about, the actual generator motor speed N of the generator motor 30 (here, an engine speed estimated by the below-described magnetic flux estimation unit 60 is used as the engine speed N) to coincide with the engine speed command N* input from the upstream controller 50.

The excitation current component command generation unit 54 sets an excitation current component command Id* to 0 (zero) during the motoring operation if the direct-current bus voltage Vdc is less than the predetermined first threshold value, and sets the excitation current component command Id* to $\alpha$ ($\alpha$>0) during the motoring operation if the direct-current bus voltage Vdc is equal to or greater than the predetermined first threshold value.

The current PI control unit 56 generates a q-axis voltage command Vq* by executing the proportional-integral control with respect to the difference between the q-axis current Iq obtained by the rotation/fixation conversion unit 52 and the q-axis current command Iq* output from the engine speed PI control unit 53. Similarly, a d-axis voltage command Vd* is generated by executing the proportional-integral control with respect to the difference between the d-axis current Id obtained by the rotation/fixation conversion unit 52 and the d-axis current command Id* output from the excitation current component command generation unit 54. The fixation/rotation conversion unit 57 obtains an $\alpha$-phase voltage command V$\alpha$* and a $\beta$-phase voltage command V$\beta$* by performing reverse coordinate transformation with respect to the q-axis voltage command Vq* and the d-axis voltage command Vd* obtained by the current PI control unit 56 while using the rotor positions as a reference. The two-phase/three-phase unit 58 obtains three-phase voltage commands Vu*, Vv*, and Vw* by performing transformation reverse to the coordinate transformation performed by the three-phase/two-phase conversion unit 51, with respect to the $\alpha$-phase voltage command V$\alpha$* and the $\beta$-phase voltage command V$\beta$*. The PWM signal generation unit 59 generates a PWM signal S by comparing the three-phase voltage commands Vu*, Vv*, and Vw* and a carrier signal.

The magnetic flux estimation unit 60 estimates the magnetic flux generated in a rotor based on the two-phase currents I$\alpha$ and I$\beta$ circuit constants (inductance, resistance, and the like), and the two-phase voltages V$\alpha$ and V$\beta$, and a variable frequency obtained by multiplying rotor angles by sine and cosine is estimated based on the magnetic flux generated in a rotor. Since the variable frequency becomes a multiplied value of the counter electrode of the rotation frequency of the rotor, a rotor angle $\theta$ can be estimated by utilizing a phase-locked loop.

According to such a control unit 40', first, two phases (U-phase and V-phase) among the three-phase currents (U-phase, V-phase, and W-phase) flowing in the generator motor 30 are detected, and the two-phase currents are input to the three-phase/two-phase conversion unit 51. The three-phase/two-phase conversion unit 51 calculates the remaining one-phase current Iw based on the input two-phase currents Iu and Iv, and the three-phase currents Iu, Iv, and Iw are converted into the two-phase currents I$\alpha$ and I$\beta$. In succession, the rotation/fixation conversion unit 52 converts the two-phase currents I$\alpha$ and I$\beta$ into the d-axis current Id and the q-axis current Iq.

The engine speed PI control unit 53 calculates the difference between the engine speed N of the generator motor 30 and the engine speed command N* applied from the upstream controller 50, and PI control is executed with respect to the difference therebetween, thereby calculating the q-axis current command Iq*. The excitation current component command generation unit 54 performs setting of Id*=0 if the direct-current bus voltage Vdc is less than the predetermined first threshold value, and performs setting of Id*=$\alpha$ ($\alpha$>0) if the direct-current bus voltage Vdc is equal to or greater than the predetermined first threshold value. In this case, the value of the d-axis current command (the excitation current component command) may be set in accordance with the value of the direct-current bus voltage Vdc. For example, information (table, function, and the like) in which the direct-current bus voltage Vdc and the d-axis current command are associated with each other may be retained so as to set the d-axis current command corresponding to the direct-current bus voltage Vdc, by using the information. In this case, the d-axis current command Id* is set to a greater value as the direct-current bus voltage Vdc becomes greater.

The current PI control unit 56 calculates the q-axis voltage command Vq* and the d-axis voltage command Vd* for causing the q-axis current Iq and the d-axis current Id to respectively coincide with the q-axis current command Iq* and the d-axis current command Id*, and as the q-axis voltage command Vq* and the d-axis voltage command Vd* pass through the fixation/rotation conversion unit 57 and the two-phase/three-phase conversion unit 58, the three-phase voltage commands Vu*, Vv*, and Vw* are calculated. Then, the PWM signal generation unit 59 generates the PWM signal S based on the three-phase voltage commands Vu*, Vv*, and Vw*. The PWM signal S is applied to the first power conversion unit 12 so as to control ON-OFF of the six switching elements included in the first power conversion unit 12.

As described above, according to the hybrid turbocharger and the method of controlling the same in the present embodiment, controlling similar to that during normal usage is performed if the direct-current bus voltage is less than the predetermined first threshold value during the motoring operation of the generator motor 30, but the d-axis current command is corrected to a value greater than that during normal usage if the direct-current bus voltage is equal to or greater than the first threshold value. Accordingly, the reactive power consumed in the generator motor 30 can be increased. As a result, the released electrical charge of the smoothing capacitor 18 provided between the direct-current buses increases. Thus, the direct-current bus voltage Vdc can be lowered.

Figure 7:
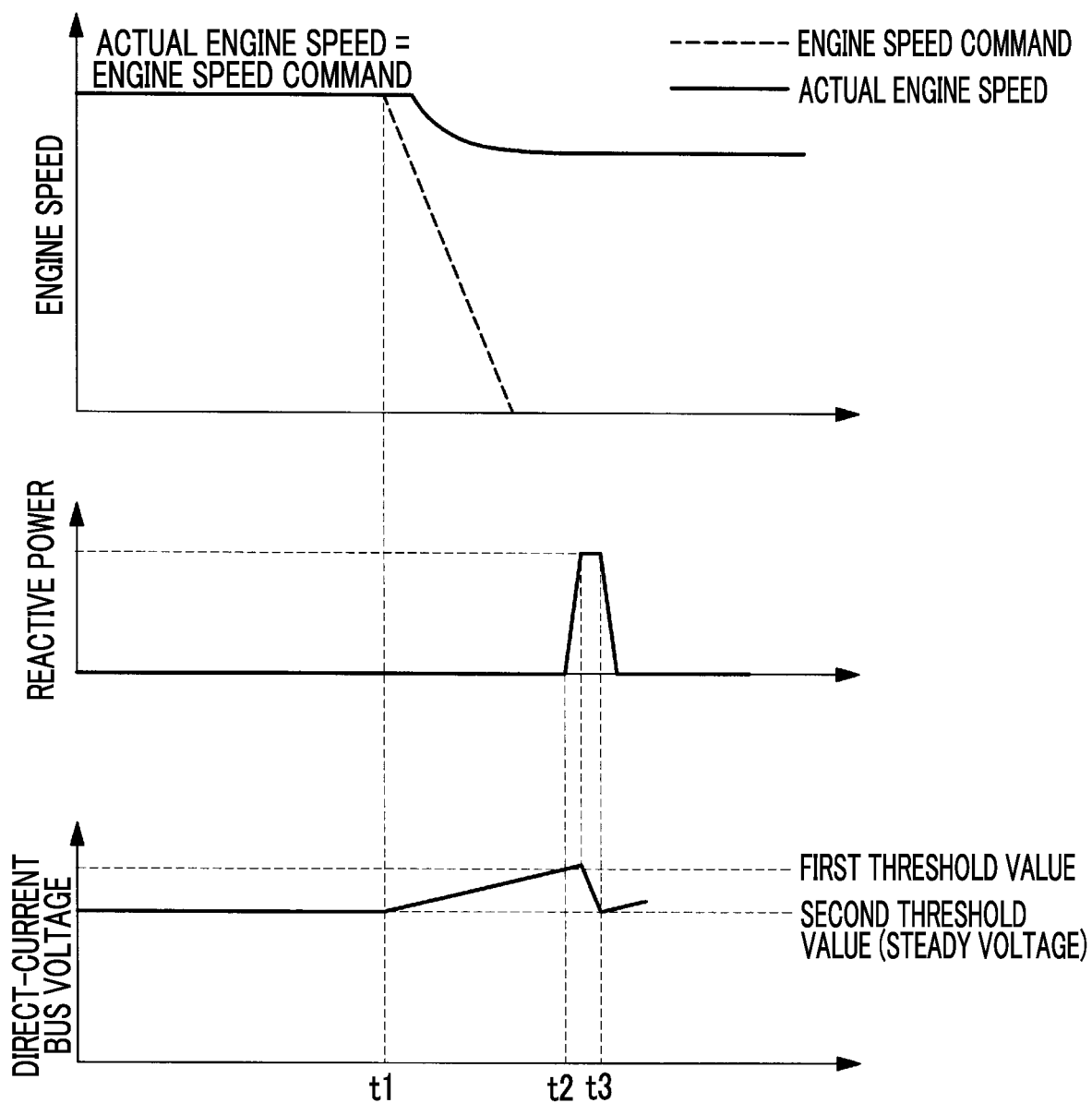
FIG. 7 is a diagram illustrating a relationship among the engine speed, reactive power, and the direct-current bus voltage in the second embodiment.

FIG. 7 illustrates a relationship among the engine speed, reactive power, and the direct-current bus voltage in the present embodiment. In FIG. 7, the direct-current bus voltage increases gradually if the engine speed command falls below the actual generator motor speed at the time t1. Then, since the d-axis current command increases if the direct-current bus voltage exceeds the first threshold value at the time t2, the reactive power increases. In addition, in accordance therewith, the direct-current bus voltage is lowered gradually. Then, since the correction value of the d-axis current command is reset to zero if the direct-current bus voltage is lowered to the second threshold value (for example, the steady voltage), the reactive power becomes zero. Since the d-axis current command (the excitation current component command) does not contribute to the engine speed of the generator motor 30, the engine speed of the generator motor is not changed, even though the d-axis current command is changed. Accordingly, it is possible to maintain stable control of the engine speed.

Subsequently, the hybrid turbocharger and the method of controlling the same according to a third embodiment will be described with reference to the drawings. In the hybrid turbocharger and the method of controlling the same according to the first embodiment and the second embodiment described above, the direct-current bus voltage Vdc is lowered by changing the control of the first power conversion unit 12 performed by the control units 40 and 40'. However, the present embodiment is different from the first embodiment and the second embodiment described above in that a hardware configuration is newly provided in order to lower the direct-current bus voltage Vdc. Hereinafter, the hybrid turbocharger and the method thereof according to the present embodiment will be described mainly regarding the points different from those in the first embodiment described above.

Figure 8:
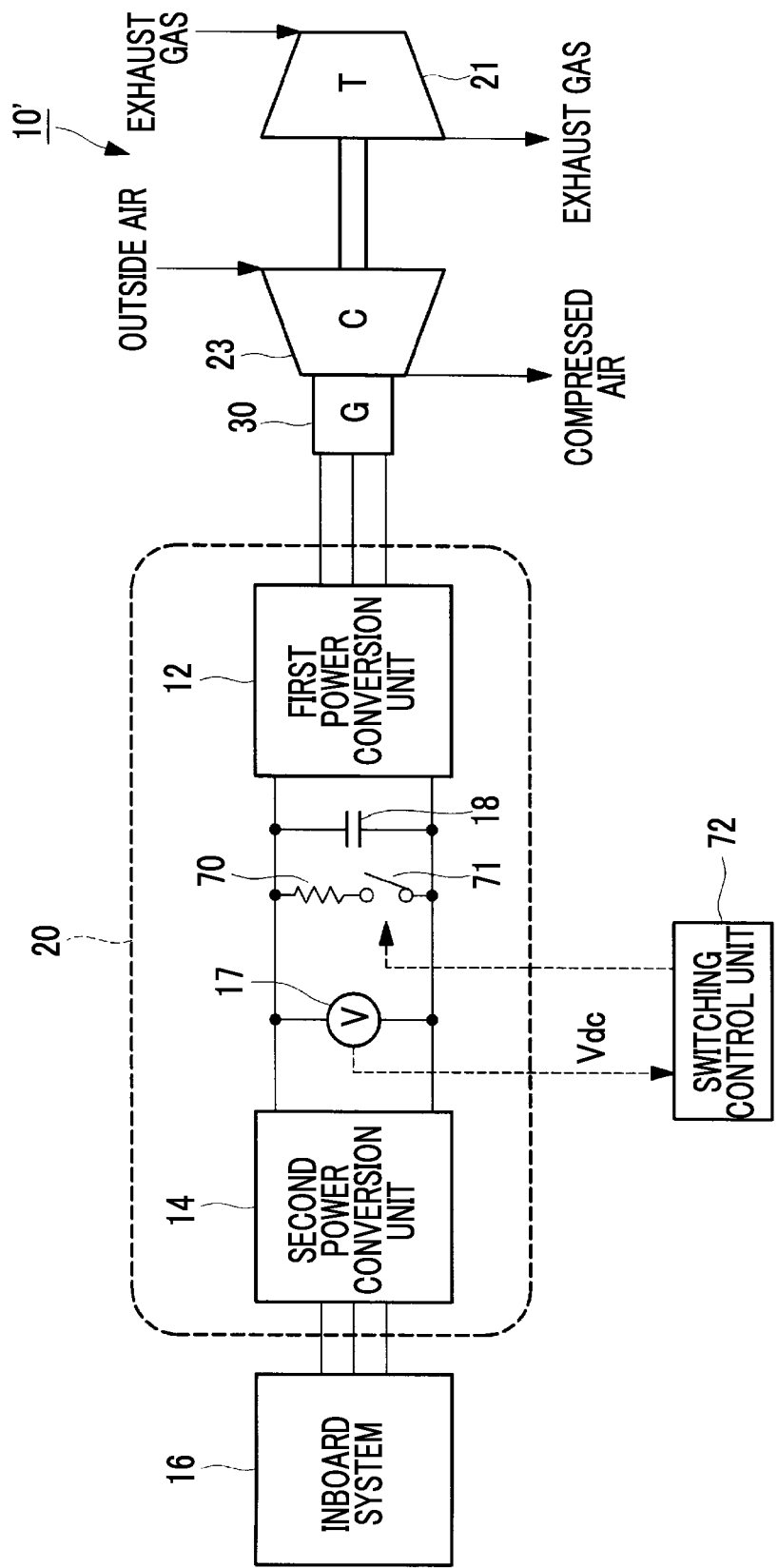
FIG. 8 is a diagram illustrating a schematic configuration of the marine vessel hybrid turbocharger in a third embodiment.

FIG. 8 is a diagram illustrating a schematic configuration of the hybrid turbocharger in the present embodiment. The same reference numerals and signs are applied to the configurations common to those in FIG. 1, and the descriptions thereof will be omitted. As illustrated in FIG. 8, a hybrid turbocharger 10' according to the present embodiment additionally includes a resistor 70 which is connected to the smoothing capacitor 18 in parallel, a semiconductor switch 71 which is connected to the resistor 70 in series, and a switching control unit 72 for controlling ON-OFF of the semiconductor switch 71. The semiconductor switch 71 is in an open state while being in the steady state, and an insulated gate bipolar transistor (IGBT), a field effect transistor (FET), and the like can be exemplified.

The switching control unit 72 performs ON-OFF ratio control of the semiconductor switch 71 within a predetermined duty cycle if the engine speed command of the generator motor 30 is less than the actual generator motor speed and the direct-current bus voltage Vdc is equal to or greater than the predetermined first threshold value during the motoring operation of the generator motor 30.

For example, the switching control unit 72 determines the switching duty by executing the proportional-integral control with respect to the difference between the direct-current bus voltage Vdc and the threshold value. As the ON-OFF ratio control of the semiconductor switch 71 is performed, the switching control unit 72 lowers at least any one of a proportional gain and an integral gain in the proportional-integral control if the fluctuation of the engine speed N of the generator motor 30 becomes equal to or greater than the predetermined value. Accordingly, the descending speed of the direct-current bus voltage can be slowed down.

The switching control unit 72 increases at least any one of the proportional gain and the integral gain in the proportional-integral control if the direct-current bus voltage Vdc does not become equal to or less than the second threshold value (for example, the steady voltage) within the predetermined period of time from the start of the ON-OFF ratio control of the semiconductor switch 71. Accordingly, the descending speed of the direct-current bus voltage Vdc can be quickened.

In such a hybrid turbocharger 10', the ON-OFF ratio control of the semiconductor switch 71 is performed by the switching control unit 72 if the engine speed command input from the upstream controller becomes less than the actual generator motor speed and the direct-current bus voltage Vdc becomes equal to or greater than the threshold value during the motoring operation of the generator motor 30. Accordingly, the electrical charge of the smoothing capacitor 18 is consumed by the resistor 70 during the period of time in which the semiconductor switch 71 is turned ON, and thus, the direct-current bus voltage Vdc can be lowered. Since the semiconductor switch 71 is used as the switching element, the switching frequency can range from several hundreds of Hz to several kHz. Thus, it is possible to prevent overcurrent at the moment of discharging electricity.

Figure 9:
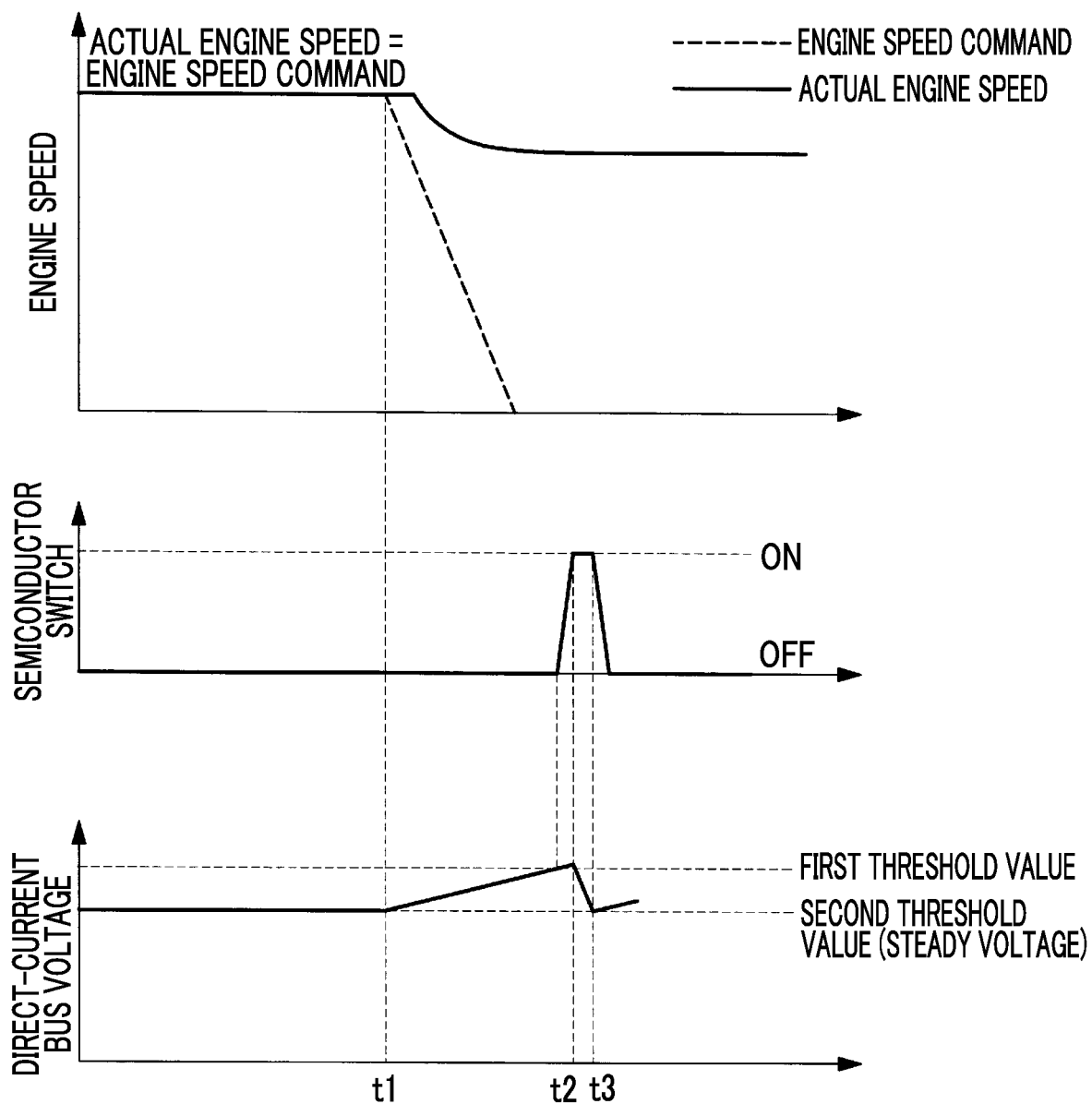
FIG. 9 is a diagram illustrating a relationship among the engine speed, the semiconductor switch, and the direct-current bus voltage in the third embodiment.
Figure 10:
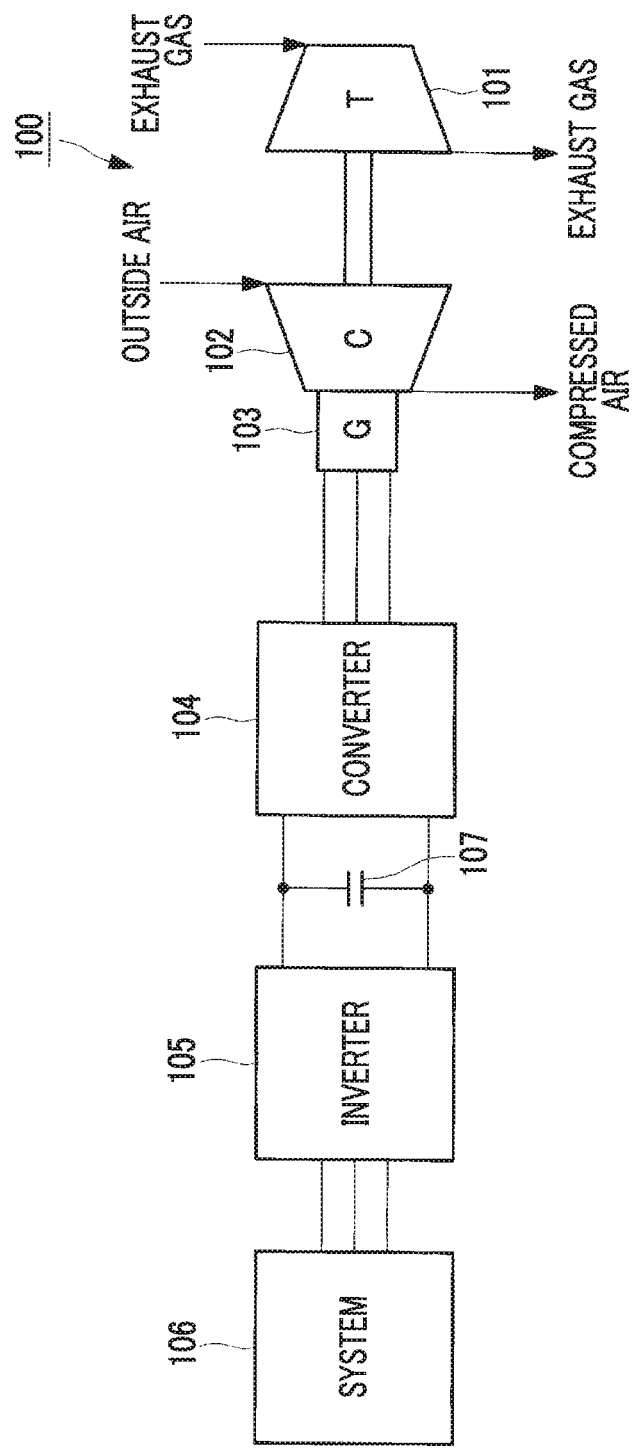
FIG. 10 is a diagram illustrating a schematic configuration of the marine vessel hybrid turbocharger.

FIG. 9 illustrates a relationship among the engine speed, the ON-OFF ratio control of the semiconductor switch, and the direct-current bus voltage in the present embodiment. The direct-current bus voltage gradually increases if the engine speed command falls below the actual generator motor speed at the time t1 in FIG. 9. Then, since the semiconductor switch starts to be turned ON and OFF at the time t2 if the direct-current bus voltage exceeds the first threshold value, the electrical charge of the smoothing capacitor 18 is discharged by the resistor 70. Accordingly, the direct-current bus voltage is lowered gradually. Then, the semiconductor switch stops being turned ON and OFF if the direct-current bus voltage is lowered to the voltage value during normal usage.

Claimed subject matter is not limited to only the embodiments described above, and various modifications can be executed by combining each of the above-described embodiments partially or in the entirety thereof without departing from the gist and the scope of claimed subject matter, for example. For example, in the embodiments described above, an example is described regarding the case where the turbocharger of claimed subject matter is applied to a marine vessel as the marine vessel hybrid turbocharger. However, the turbocharger of claimed subject matter can be applied not only to a marine vessel but can also be applied to other apparatuses. In the embodiments described above, the example is described regarding the case where the generator motor 30 is included as the electric motor which can perform both the regeneration (power generation) operation and the motoring operation. However, an electric motor which can perform only the motoring operation without having the function of regeneration may be employed in place of the generator motor 30. In this case, an inverter in which the direct-current power is converted into the alternating-current power and is output may be employed as the power conversion unit.

The invention claimed is:

1. A method of preventing a fluctuation of a voltage of direct-current power, and the direct current power being converted into alternating-current power in a power conversion unit of a turbocharged internal combustion engine including a turbocharger having a compressor driven by a turbine via a shaft, an electric motor coupled to the compressor of the turbocharger, a smoothing capacitor coupled to the power conversion unit, and a control unit providing a control signal, the method comprising;

generating an actual generator motor speed to comply with a generator speed command of the electric motor while monitoring an operation of the electric motor by the control unit; and increasing an excitation current value by the control unit if the generator motor speed command of the electric motor is less than the actual generator motor speed and a line-to-line voltage of the smoothing capacitor approaches a predetermined threshold value that was set for the line-to-line voltage during operation of the electric motor.

2. A turbocharger comprising:

a compressor driven by a turbine to boost ambient air to an internal combustion engine;

an electric motor coupled to a rotary shaft of the compressor;

a power conversion unit to convert direct-current power to alternating-current power to supply the electric motor;

a smoothing capacitor coupled to a direct-current bus, the direct-current bus coupled to the power conversion unit; and a control unit to send a control signal to the power conversion unit to reach a measured value of a generator motor speed to comply with a value of a generator motor speed command of an input signal to the electric motor, from an upstream controller, during operation of the electric motor, wherein the control unit to generate a control command to increase an excitation current value and to send the control command to the power conversion unit if the value of the generator motor speed command of the electric motor is less than a value of the measured generator motor speed and a line-to-line voltage of the smoothing capacitor is equal to or greater than a predetermined threshold value that was set for the line-to-line voltage during operation of the electric motor.

3. A marine vessel comprising:

a turbocharger, including:

a compressor to be driven by a turbine of the marine vessel to boost ambient air to an internal combustion engine;

an electric motor coupled to a rotary shaft of the compressor;

a power conversion unit to convert direct-current power to alternating-current power to supply the electric motor;

a smoothing capacitor coupled to a direct-current bus, the direct-current bus coupled to the power conversion unit;

a control unit to send a control signal to the power conversion unit to reach a measured value of a generator motor speed to comply with a value of a generator motor speed command of an input signal to the electric motor, from an upstream controller, during operation of the electric motor, wherein the control unit is to generate a control command to increase a value of an excitation current value and to send the control command to the power conversion unit if the value of the generator motor speed command of the electric motor is less than a measured value of the generator motor speed and a line-to-line voltage of the smoothing capacitor is equal to or greater than a predetermined threshold value that was set for the line-to-line voltage during operation of the electric motor.

* * * * *